358-86. OR 3,566,020 SR

United States Patent

[11] 3,566,020

[72] Inventors Rupert Ivor Kinross
Shepperton;
Eric John Gargini, West Drayton, England

[21] Appl. No. 666,287
[22] Filed Sept. 8, 1967
[45] Patented Feb. 23, 1971
[73] Assignee Communications Patents Limited
[32] Priority Sept. 13, 1966
[33] Great Britain
[31] 40834/66

[54] WIRED BROADCASTING SYSTEMS AND APPARATUS THEREFOR
4 Claims, 3 Drawing Figs.

[52] U.S. Cl. ........................................................ 178/6
[51] Int. Cl. ........................................................ H04n 7/10
[50] Field of Search ........................................... 178/6, 5.1; 335/138, 206; 325/(Inquired)

[56] References Cited

UNITED STATES PATENTS

| | | | |
|---|---|---|---|
| 3,426,303 | 2/1969 | Buckner ........................ | 335/206 |
| 3,405,376 | 10/1968 | Giese, Jr. et al. ............. | 335/138 |
| 3,244,809 | 4/1966 | Fuller et al. .................... | 178/6 |

*Primary Examiner*—Richard Murray
*Attorney*—Laurence R. Brown

ABSTRACT: In a wired-broadcasting system affording selection of a plurality of program channels, a television subscriber is connected by a three wire cable to a control station. At this station cables from a multiplicity of program channels are available through a switching control circuit for connection by operating selected ones of a set of solenoids having associated switching contacts. Selective control of the solenoids to choose channels is effected by remote signals from the subscriber station transmitted through the wire cable. Thus, a three wire cable to a subscriber provides access to a plurality of wired program channels.

T5002

INVENTORS
Rupert I. Kinross
Eric J. Gargini,

BY Laurence R. Brown
ATTORNEY

INVENTORS

Rupert I. Kinross
Eric J. Gargini,

BY Laurence R. Brown

ATTORNEY

WIRED BROADCASTING SYSTEMS AND APPARATUS THEREFOR

This invention relates to wired broadcast systems and apparatus therefor. The invention is particularly concerned with systems which provide a plurality of television programmes each of which is distributed over a corresponding pair of conductors, programme selection taking place by the selective connection of the subscriber's terminal unit to that pair of conductors which carries the desired programme.

It is usual to effect the connection between the terminal unit and the pair of conductors carrying the desired programmes at or adjacent the subscriber's terminal unit. This has generally meant that subscribers can be economically connected to the network only if the distance between the subscriber's premises and a distribution feeder of the network is relatively short because of the necessity of extending each pair of conductors of the network to the subscriber's terminal unit or at least to a subscriber's outlet in close proximity thereto. It is an object of the present invention to provide a wired broadcasting system in which this extension of each pair of conductors of the network from a distribution feeder to the subscriber's terminal unit or outlet can be avoided in a convenient and economic manner.

According to the invention there is provided a wired-broadcasting system comprising a distribution feeder having a plurality of pairs of conductors, at least one subscriber's box along the path of said distribution feeder, a subscriber's feeder extending between the subscriber's box and a subscriber's terminal unit comprising a pair of signal conductors surrounded by an electrically conductive screen thereby providing three conductor paths, switching means at the subscriber's box comprising a plurality of reed switches having operating solenoids associated with said conductor paths, said switches serving to effect selective connection of said pair of signal conductors with one of the pairs of conductors in the distribution feeder and control means operable at or adjacent the terminal unit for controlling the flow of electric current through said conductor paths to said cooperating solenoids.

The invention also provides a wired-broadcasting system comprising a distribution feeder having a plurality of pairs of conductors, at least on subscriber's box along the path of said distribution feeder, a subscriber's feeder having a single pair of programme signal conductors extending between the subscriber'box and a subscriber's terminal unit, switching means at the subscriber's box for connecting the pair of signal conductors in the subscriber's feeder with a desired one of the pairs of conductors in said distribution feeder and control means operable at or adjacent the terminal unit to control the switching means at the subscriber's box.

In order that the invention may be more readily understood some embodiments thereof will now be described, by way of example only, with reference to the accompanying drawings, in which.

Figures 1, 2:
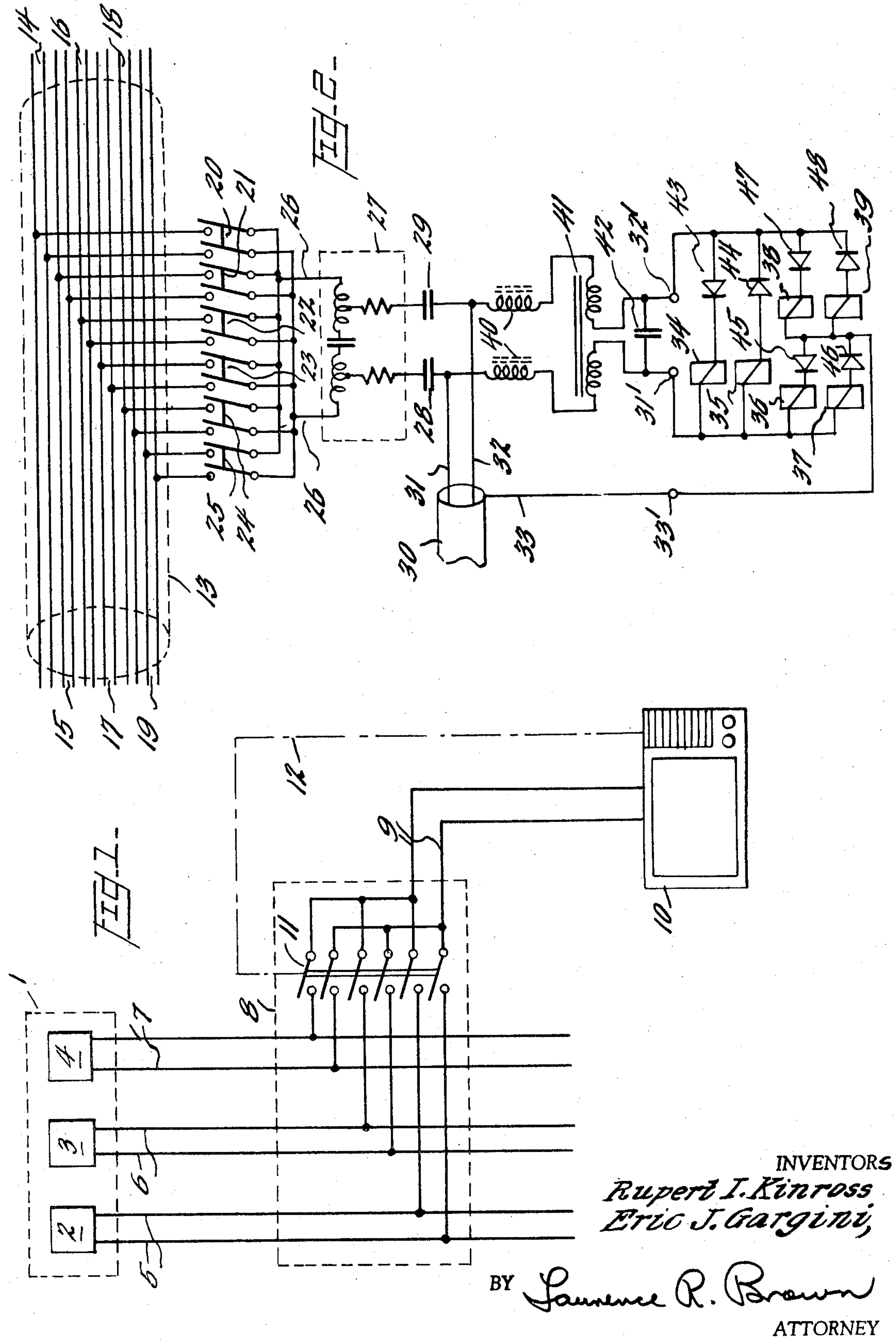
FIG. 1 is a diagram of part of a wired broadcasting system in accordance with the present invention.
FIG. 2 is a detailed diagram of a subscriber's box in the system shown in FIG. 1.

In FIG. 1 the wired broadcasting system comprises a transmitting station 1 at which are located three sets of transmitting apparatus 2, 3, 4 each in respect of a different television programme. Each transmitting apparatus is arranged to energize a corresponding pair of conductors 5, 6, 7 in a distribution feeder. At least one location along the length of the distribution feeder there is arranged a subscriber's box 8, from which extends a subscriber's feeder having a single pair of programme signal conductors 9 to supply signals in respect of a desired television program, present in the distribution feeder, to a terminal unit 10. The selection of a desired programme is effected by connecting, in the subscriber's box 8, the pair of signal conductors 9 to the pair of conductors 5, 6 or 7 which carries the desired programme. The required connection is established by a switch 11 which is controlled from the terminal unit 10 over the linkage shown diagrammatically at 12. The linkage 12 may be electrical, such for example as a pair of conductors linking a solenoid arranged to actuate the switch 11 with an electric power source under the control of the control member. The conductors linking the solenoid with the electric power source will usually be, or at least include, the signal conductors 9. When the linkage 12 is electrical the switch 11 may comprise a plurality of electromagnetic reed switches, each associated with an energizing solenoid, ferreeds, transistor gates or diode gates.

FIG. 2 is a detailed diagram of a subscriber's box which provides for the selection of six programmes. This box is arranged to receive an opened portion of a six-pair distribution feeder 13 having six pairs of conductors 14—19. Each of these six pairs of conductors is associated with a corresponding electromagnetic reed switch 20—25 having a pair of "make" contacts. Signals from the selected pair of conductors 14—19 pass along the pair 26 to an impedance network 27, commonly referred to as an "insert," by which the subscriber's terminal unit is isolated from the others on the network. After passing through the insert 27 the selected signals pass through a pair of capacitors 28, 29 and thence to the subscriber's feeder 30 which comprises a pair of programmes signal conductors 31, 32 enclosed in a conductive screen 33.

Actuation of the reed switches 20—25 is effected by direct current signals applied between the conductors 31 and 32 and the screen 33. The capacitors 28, 29 prevent these direct current signals from passing on to the pairs of conductors of the distribution feeder 13. The direct current signals on the conductors 31, 32 are passed to the solenoids 34—39 through radio frequency chokes 40, which prevent the high frequency television signals being attenuated by the shunting effect of the solenoids and other components connected between the conductors 31, 32, and through an audio frequency choke 41 which has the same effect in respect of the audio frequency sound signals which, in known manner, accompany the high frequency television signals. After the choke 41 the conductors are shunted by a capacitor 42 which serves to reduce still further any audio or high frequency signals which might appear between them. The solenoid coils 34—39 are connected in parallel pairs between adjacent pairs of the conductors 31, 32 and 33. The solenoid coils of each parallel pair each have one of the diodes 43—48 connected in series the polarity of the diode in series with one solenoid coil of a parallel pair being opposite to that of the diode in series with the other solenoid of that parallel pair.

Any desired solenoid coil may be energized by applying between those of the conductors 31, 32 and 33 to which it is directly connected a direct current of the appropriate polarity. If the resistances of the solenoid coils, the forward resistances of the diodes and the potential of the applied direct current are chosen carefully the desired solenoid coil may be energized to a degree sufficient to actuate its associated reed relay, while the two remaining solenoid coils which are associated with diodes of the same polarity and connected in shunt therewith are energized to a degree which is insufficient to actuate their associated reed relays.

In this way the conductors already present in the subscriber's feeder suffice to provide for the selection of one from as many as six programmes. Should a selection from more than six programmes be desired the addition of a single auxiliary conductor to the twin screened subscriber's feeder shown in FIG. 2 will enable twelve programmes to be selected.

Figure 3:
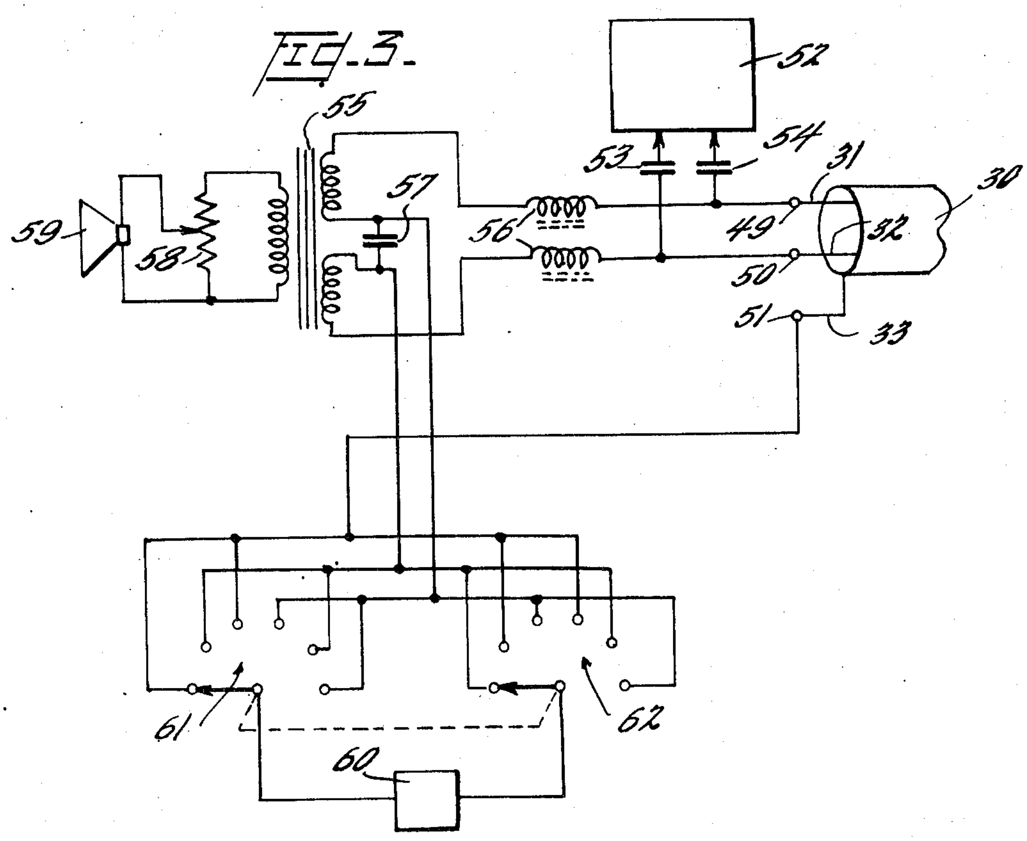
FIG. 3 is a diagram of a subscriber's terminal unit in the system program, in FIG. 1.

FIG. 3 is a detailed circuit diagram of a subscriber's terminal unit for use in conjunction with the subscriber's box shown in FIG. 2. The twin, screened lead 30 forming the subscriber's feeder has the signal conductors 31, 32 connected to input terminals 49, 50 respectively while the conductive screen 33 is connected to the terminal 51. High frequency vision signals applied between the terminals 49, 50 are passed to the vision signal processing and display section of the terminal unit, which section is diagrammatically indicated at 52. These signals pass to the section 52 through capacitors 53, 54 which are arranged to block direct currents applied to the terminals 49, 50 and present relatively high impedance to audio frequency signals and a relatively low impedance to the high frequency vision signals. The audio frequency sound signals are applied to the split primary winding of a loudspeaker transformer 55 through the high frequency chokes 56 which serve to prevent the high frequency vision signals being attenuated by the shunt connection of the transformer 55. The primary winding of the transformer 55 is completed, in respect of audio signals, by the capacitor 57. The secondary winding of the transformer 55 is arranged to apply the sound signals to the track of a volume control 58. A loudspeaker 59 is connected between one end of the track and the wiper.

A direct current power source 60 is arranged to apply direct current potentials between any pair of the terminals 49, 50 and 51 and in either polarity in order to effect selection of the desired program in the subscriber's box shown in FIG. 2. The power source 60 is connected to the terminals 49, 50 and 51 through a switch, which forms the control means, having two sections 61, 62. Connection from the switch sections 61, 62 to the terminal 51 is made directly while connection to the terminals 49 and 50 is made through a corresponding part of the primary winding of the transformer 55 and a corresponding one of the high frequency chokes 56.

We claim:

1. A wired-broadcasting system which from any one of six signal channels selected from a multiple channel distribution feeder conveys a broadcast program over a cable consisting of a single shielded pair to a receiver at a remote subscriber location, wherein the shielded pair in addition carries over its three conductors all the control signals necessary for selecting any one of said six signal channels, said system comprising in combination, six selection switching devices located in the vicinity of the distribution feeder, a set of six selection switches located in the vicinity of the receiver at the remote subscriber location each switch corresponding to a single one of said selection switching devices, means at said remote subscriber location defining six different signals, from actuation of corresponding ones of said switches, each signal capable of being transmitted through said three conductors, and means at the vicinity of said six devices for directing each different signal received through said three conductors to actuate a different one of said six switching devices to thereby select one of said six signal channels for transmission from said distribution feeder to said receiver at the remote subscriber location solely over said shielded pair cable.

2. A wired-boradcasting system comprising a distribution feeder having a plurality of at least two pairs of conductors, at least one subscriber's box along the path of said distribution feeder, a subscriber's feeder extending between subscriber's box and a subscriber's terminal unit and consisting of a pair of signal conductors surrounded by an electrically conductive screen thereby providing three conductor paths, switching means at the subscriber's terminal unit comprising a plurality of selection switches, one for each of said six pairs of conductors with each selection switch having operating solenoids located at said subscriber's box electrically connected thereto through said three conductor paths, said switches serving to effect selective connection of said pair of signal conductors with only one of the six pairs of conductors in the distribution feeder, and control means operable at or adjacent the terminal unit for controlling the flow of electric current through solely said three conductor paths to said operating solenoids to select a single one of said solenoids designated by a corresponding one of said selection switches including at least two operating solenoids each having a rectifying device arranged in series therewith, two such solenoids with rectifier in series combination being connected in parallel between two of said conductors with said rectifiers connected in opposite polarity and said control means comprising a source of direct current potential for applying a direct current potential of opposite polarities between said two conductor paths thus serving to energize one or other of said operating solenoids in dependence upon its polarity.

3. A wired-broadcasting system as claimed in claim 2, wherein two oppositely polarized series combinations of an operating solenoid and a rectifying device are arranged in parallel between each of said three conductor paths and another of said conductor paths in a delta configuration whereby any one series combination of operating solenoid and rectifying device is shunted by two similarly polarized combinations connected in series, said source of direct current potential being arranged to apply a potential across any one series combination which is sufficient to cause actuation of the switch associated with the operating solenoid of that combination and is at the same time insufficient to cause actuation of the switches associated with each of the operating solenoids of the two similarly polarized series combinations which are connected in shunt therewith.

4. A wired-broadcasting system as claimed in claim 2, wherein the subscriber's equipment includes a bidirectional direct current power source and a switch device by means of which the potential provided by said power source may be applied between any two of the three conductor paths extending between said subscriber's equipment and the subscriber's box with either polarity for the purpose of energizing a desired one of said operating solenoids and its associated switch.